United States Patent [19] [11] 4,273,681
Nonnenmann [45] Jun. 16, 1981

[54] SUPPORT MATRIX FOR A CATALYTIC REACTOR FOR SCRUBBING EXHAUST GASES IN AN INTERNAL COMBUSTION ENGINE

[75] Inventor: Manfred Nonnenmann, Schwieberdingen, Fed. Rep. of Germany

[73] Assignee: Süddeutsche Kühlerfabrik Julius Fr. Behr GmbH & Co. KG, Fed. Rep. of Germany

[21] Appl. No.: 113,136

[22] Filed: Jan. 17, 1980

[30] Foreign Application Priority Data

Jan. 25, 1979 [DE] Fed. Rep. of Germany ....... 2902779

[51] Int. Cl.[3] ......................... B01J 23/74; B01J 35/02
[52] U.S. Cl. ................................ 252/472; 252/477 R; 423/213.5
[58] Field of Search ............................ 252/472, 477 R

[56] References Cited

U.S. PATENT DOCUMENTS 4,152,302 5/1979 Nonnenmann et al. ............. 252/472
4,190,559 2/1980 Retallick .......................... 252/477 R

FOREIGN PATENT DOCUMENTS 1452982 10/1976 United Kingdom .

OTHER PUBLICATIONS

Above A and L were cited by applicant.

*Primary Examiner*—W. J. Shine
*Attorney, Agent, or Firm*—Browdy and Neimark

[57] ABSTRACT

A support matrix for a catalytic reactor for scrubbing exhaust gases in an internal combustion engine, composed of layers of alternating steel panels at least some of which are coated with a catalyzer and at least one of which is corrugated so as to form flow channels for the exhaust gases. In order to increase the turbulence of the flow in the channels of the matrix, the smooth panel and/or the corrugated panel is subdivided into narrow strips which lie adjacent to one another and are encountered sequentially by the inflowing exhaust gas. Furthermore, the exhaust gases which are divided into small streams may recombine between the strips and thus encounter renewed admixture. They are then redivided in the subsequent strip resulting in an overall intensive contact of each gas stream thread with a surface of the subsequent narrow strip, thereby substantially improving the catalytic efficiency.

17 Claims, 7 Drawing Figures

SUPPORT MATRIX FOR A CATALYTIC REACTOR FOR SCRUBBING EXHAUST GASES IN AN INTERNAL COMBUSTION ENGINE

FIELD OF THE INVENTION

The invention relates to a support matrix for a catalytic reactor for scrubbing exhaust gases in internal combustion engines, especially gasoline engines in motor vehicles, made of high temperature resistant steel, composed of alternating steel panels, at least one of which is corrugated, whereby the steel panels are coated with catalyst before the support matrix is assembled, or coated after the support matrix has been assembled.

BACKGROUND OF THE INVENTION

A support matrix of this type is known from GB Pat. No. 1 452 982.

In this known support matrix, the individual layers of steel panels can be welded together. The support matrix itself can be retained in a jacket by holding means, preferably disposed in front of the end of the matrix, this holding means consisting for example, of intersecting struts, wires, or rods, or a wire mesh.

Welding the individual layers of steel paneling is a costly procedure. The holding means at the ends of the matrix do not always suffice to prevent a mutual axial displacement of the individual layers of the steel panels in the matrix.

In a related patent, U.S. Pat. No. 4,152,302, the contents of which are herein incorporated by reference, it had been proposed to prevent the axial displacement of the layers within the support matrix as well as to provide for turbulence of gases in the channels of the matrix by fabricating at least one steel panel or steel strip of the matrix with projections and/or depressions. In particular, the depressions were to be embodied as holes or openings in the smooth steel panel only. Alternatively, the holes might be placed exclusively in the corrugated steel panels.

SUMMARY OF THE INVENTION

It is an object of the present invention to provide an improvement to the support matrix described in the U.S. Pat. No. 4,152,302 which results in the generation of very intensive turbulence of the gas flow through the catalytic reactor and thus makes possible a substantial shortening of the length of the matrix.

These and other objects are attained according to the present invention by providing a support matrix which is a combination of smooth and/or corrugated steel foil or steel strips in which apertures are provided in the smooth and/or corrugated strips and extend over the entire length thereof. The net result of this disposition is that, in the direction of gas flow, a number of isolated narrow metal strips is encountered.

The construction of the matrix results in a mixture of the gas flow between the individual narrow strips and the mixture is then again divided in the subsequent narrow strip so that newly formed threads of gas which had not been in contact with the surface of the previous strip now come in contact with the new strip. This type of flow substantially improves the catalytic effectiveness of the matrix which makes it possible to contruct a reactor which is shorter in the direction of gas flow.

This shortened construction in turn results in cost savings, space savings and a reduction in overall weight.

In one embodiment of the invention, the narrow strips may be smooth and/or corrugated. In a further characteristic of the invention, the narrow strips are located alongside one another, i.e., behind one another in the direction of gas flow and are separated from one another in that direction by a distance which is less than or equal to 25 mm, permitting a mixture of the gas flow in the spaces between the strips.

The general catalytic effectiveness is increased by providing as many narrow strips adjacent to one another as possible. The difficulty of constructing a matrix having so many strips requires a compromise solution in which the width of each of the strips in the direction of gas flow is less than or equal to 50 mm.

In a further advantageous embodiment of the invention, the strips or panels have corrugations of varying character. The character of the corrugations may be changed by changing the amplitude, the effective wavelength of the corrugations and/or the inclination, i.e., the direction of the wave in the corrugation.

A particularly advantageous embodiment is one in which the amplitudes of the corrugation of adjacent strips is different. However, it is also possible independently thereof or in addition thereto to alter the wavelength of corrugations in adjacent strips which insures that even when the strips are very close to one another, they are encountered by always regenerated gas flow threads.

The different corrugation may also take the form of decreasing the effective wavelength of the corrugations in the direction of gas flow which is advantageous when exhaust gases containing solids are processed because the soiling of the matrix is then delayed.

In one embodiment of the invention, the corrugation of adjacent and/or sequential corrugated strips or panels may change. In a particularly advantageous embodiment of the invention, the angle which the corrugations make with a reference line could be different or in the opposite sense from one strip to the next.

In still another embodiment of the invention, it is advantageous to provide at least one of the panels or strips in a particular layer with additional apertures which are so disposed as to be covered by strips of the next layer of the matrix.

It may also be advantageous according to one embodiment of the invention to change the thickness of adjacent or sequential strips.

In still another embodiment of the invention, the entire matrix is composed of corrugated bands in which the waves of the corrugation extend obliquely over the entire width of the band.

Further characteristics and advantages of the invention are contained in the following description of preferred exemplary embodiments which relate to the drawing.

DESCRIPTION OF THE PREFERRED EMBODIMENTS

Figure 1:
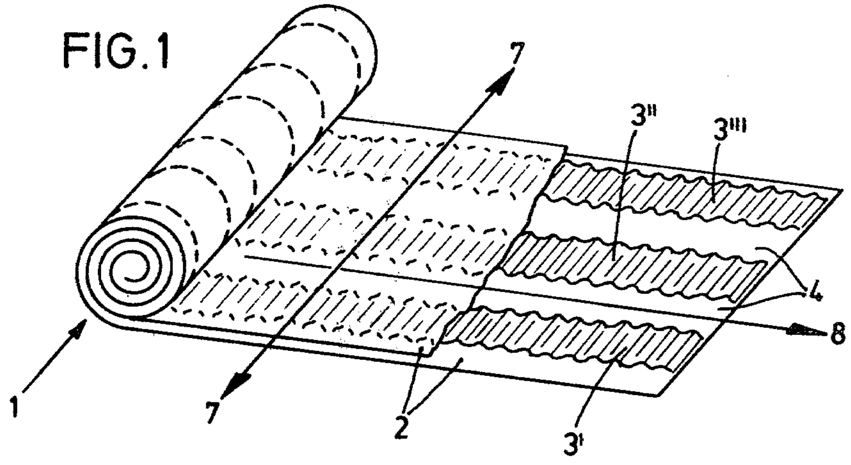
FIG. 1 is a perspective partially sectional view of a first embodiment of the invention.

In the description which follows and which relates to all of the figures of the drawing, the overall support matrix will be identified with the numeral 1, the smooth steel panels or strips will carry the numeral 2 while the corrugated steel panels or strips will be designated with the numeral 3. Furthermore, the direction of gas flow carries the label 7 and the longitudinal direction of the strips or panels is identified by the arrow 8.

In the first embodiment of the invention illustrated in FIG. 1, there is shown a support matrix 1 only partially rolled up and showing the sandwich of steel bands and strips making up the roll. The sandwich is seen to be composed of a first smooth layer of steel panel or band 2 on which is placed a number of corrugated strips 3 which are then covered by another smooth band 2. The strips 3', 3'', 3''', are formed by separations 4 therebetween which may extend over the entire length of the band and strips. These separations define the strips 3', 3'', 3''' as seen in the direction of the gas flow which proceeds along the arrow 7. The strips 3', 3'', 3''' can be attached to the adjacent smooth foil 2 by any suitable method, for example soldering or welding, so as to prevent the relative motion with respect to the smooth band. The relative motion may also be prevented, for example, by very firmly rolling the layers of steel stripping and bands so that the corrugation of the strips 3 dig into the relatively thin smooth foils 2 and prevent any subsequent relative movement.

The number of strips 3', 3'', 3''', etc. depends on the specifications of the catalytic reactor of which they form a part. In the extreme case, it may be advantageous to provide a single corrugated strip 3 of a width substantially corresponding to the adjacent smooth band 2. Preferably however, there are at least three strips 3', 3'', 3''' and a large number is possible if the width of each strip is suitably reduced. Advantageously, the separation in the direction of gas flow 7 between two sequential strips is less or equal to 25 mm. The width of each strip in the direction of the gas flow should be equal to or less than 50 mm. It is expressly noted in view of the foregoing that the illustration of three strips, as in FIG. 1, is to be regarded only as a schematic embodiment and is not intended to be considered as limiting.

Figure 2:
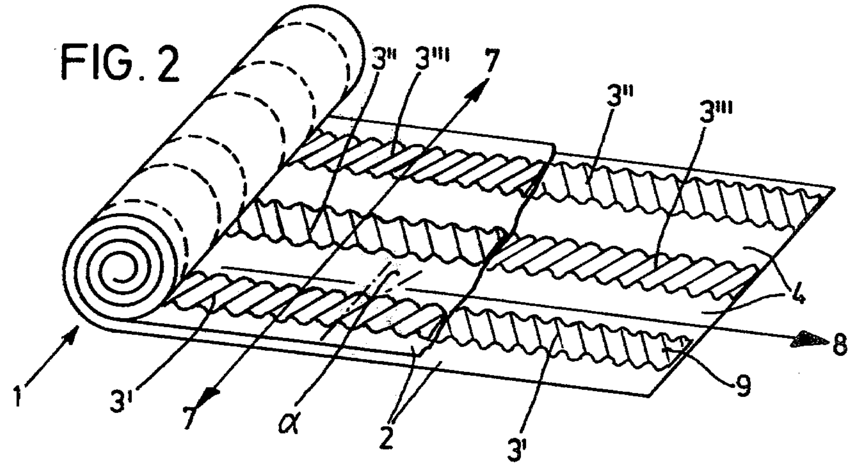
FIG. 2 is an illustration of an embodiment similar to that of FIG. 1 in which the character of the corrugation of adjacent or sequential strips is different.

In the second embodiment of the invention illustrated in FIG. 2, the character of the corrugation (waves 9) in the adjacent strips 3', 3'', 3''' is different. For example, the waves 9 shown in FIG. 2 show an alternating obliqueness with respect to the longitudinal direction 8.

Figure 7:
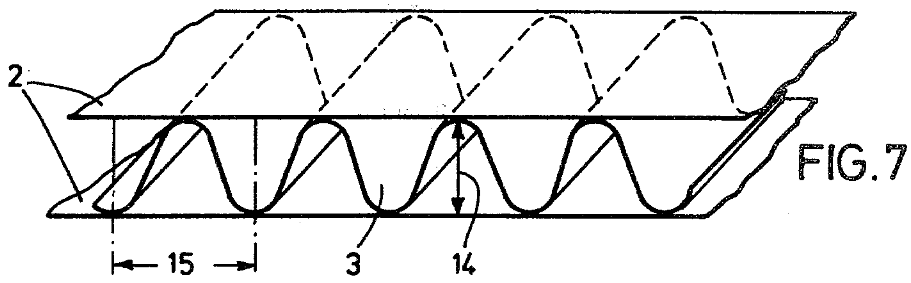
FIG. 7 is a detailed enlargement of various characteristics of the corrugations of the band.

However, the corrugated strips of neighboring layers may also have different amplitudes 14 (see FIG. 7).

Still further, it is possible to change the wavelength 15 (see FIG. 7) in the different strips.

Figure 3:
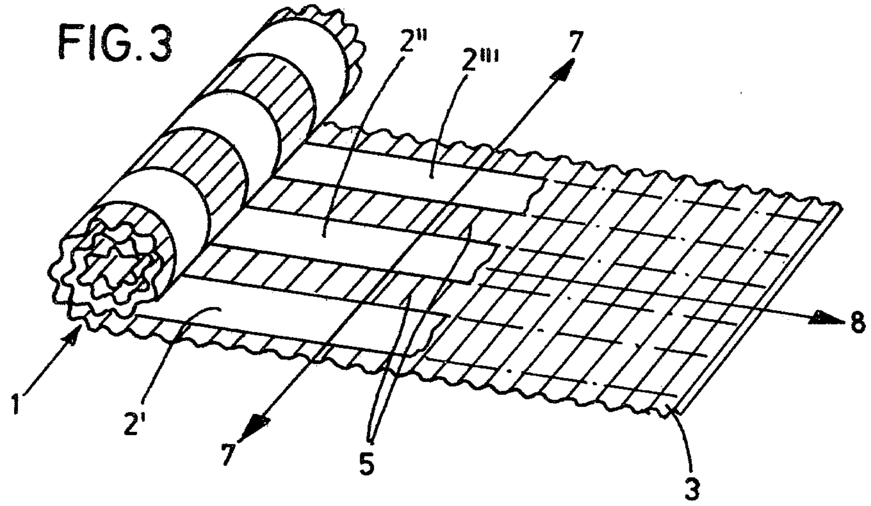
FIG. 3 is a view of an embodiment with continuous corrugated bands and smooth strips.

The embodiment illustrated in FIG. 3 differs from that of FIGS. 1 and 2 only in that the corrugated steel band has a width substantially extending over the entire depth of the matrix 1 while it is the smooth strips 2 that are narrow and are embodied as strips 2', 2'', 2'''. The number of strips 2 can be the same and their width and separation can be the same as was previously discussed with respect to the strips 3 of FIGS. 1 and 2.

Figure 4:
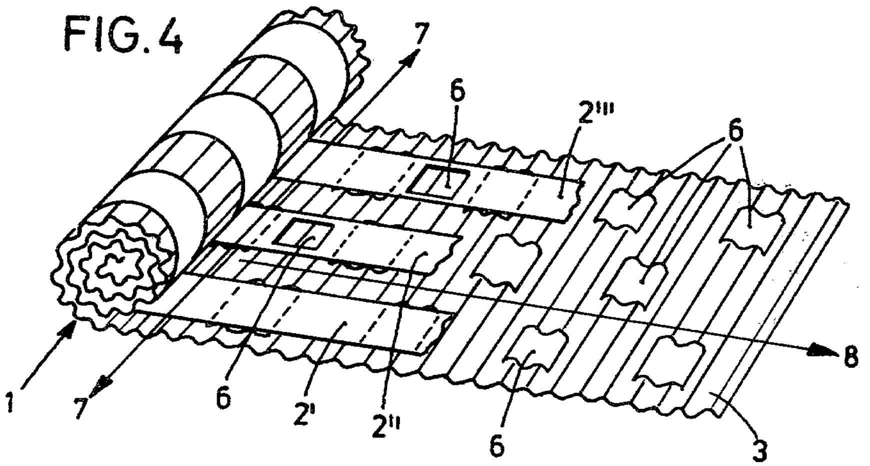
FIG. 4 is a view of an embodiment in which one or the other of the two bands or strips is provided with openings or apertures.

In the embodiment of FIG. 4, which substantially corresponds to that of FIG. 3, the corrugated band 3 has additional openings or holes 6. The smooth strips 2', 2'', 2''' are so located as to lie in the region of the opening 6 and may cover the latter partially or completely. This disposition causes a further increased turbulence of the gases and an increased axial rigidity because the relatively thin strips 2', 2'', 2''' conform to the openings 6 in the corrugated steel band 3. However, the embodiment of FIG. 4 may also be constructed with a smooth band 2 and corrugated strips 3', 3'', 3''' and the openings 6 would be located in the smooth steel band 2. The location of the openings 6 may further be so chosen as to lie between the strips 2', 2'', 2''' or 3', 3'', 3'''. Again, it is also possible to provide openings 6 lying partially in the strips and partially in the spaces between the strips. Still further, the strips themselves may be provided with openings 6 as also shown in FIG. 4.

If the length of the openings is extended over the entire length of the steel band, they cause a separation of the material of the band into small strips so that the entire matrix is composed of a roll of strips in which neighboring layers overlap. Thus, where one of the components has additional apertures, these may extend over the entire length of the component of the matrix, thereby separating the second one of the panels into separate strips and wherein strips of neighboring layers overlap.

Figure 5:
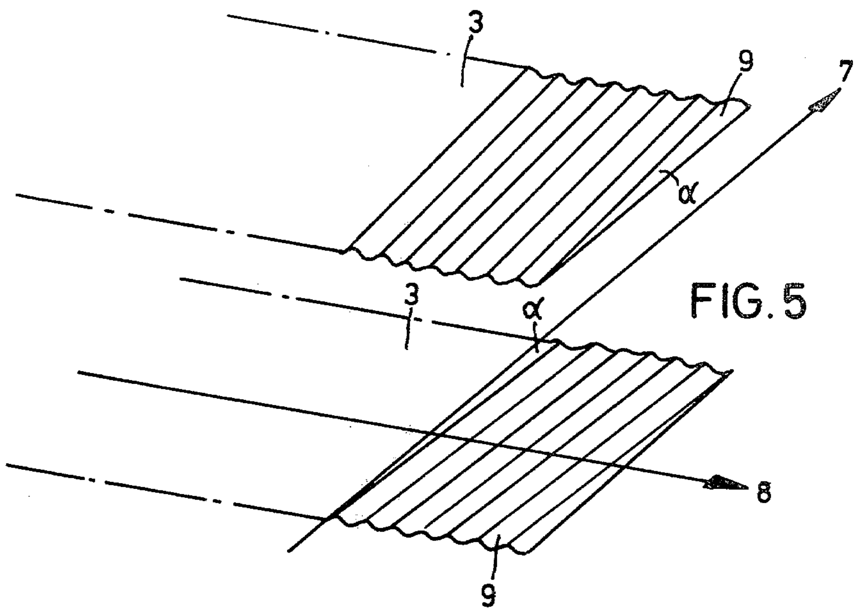
FIG. 5 illustrates schematically an embodiment in which the corrugations are oblique with respect to the direction of gas flow.

An embodiment of the invention illustrated in FIG. 5 provides for neighboring layers of bands or strips to have corrugations 9 the obliquity of which with respect to the long axis 8 alternates, i.e. the angle of adjacent corrugations is alternatingly different. In particular, the obliquity is shown as an angle $\alpha$ with respect to the transverse direction of gas flow 7, i.e. the waves of the corrugation make an angle other than zero degrees with the direction of gas flow through the matrix.

Figure 6:
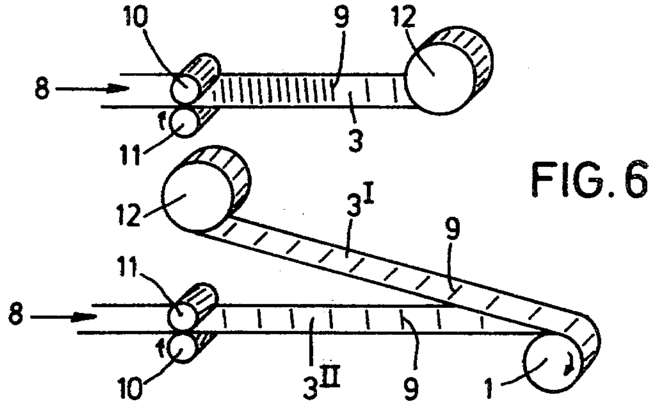
FIG. 6 is a schematic illustration of an apparatus for constructing a matrix with oblique corrugations.

A matrix such as illustrated in FIG. 5 may be produced by a machine illustrated schematically in FIG. 6 in which, in a first step, one band 3 having oblique corrugations 9 and rolled up on a storage reel 12. The corrugations are imparted by geared rollers 10 and 11. Subsequently, the band so obtained is unrolled from the storage reel 12 and rolled up together with another band similarly treated by the rollers 10 and 11. The two bands $3^I$ and $3^{II}$ are rolled up with opposite obliquity into a common matrix 1, i.e. the angle between the waves of the corrugation and the direction of gas flow of adjacent component panels or strips of the matrix alternates in algebraic sign. If two separate pairs of geared rollers 10, 11 are available, the two bands $3^I$ and $3^{II}$ may be produced and rolled up simultaneously. The matrix so produced may have panels which are all corrugated and the corrugations extend over the entire width of the band in a direction oblique with respect to the direction of gas flow.

It is also possible, in a manner not shown, to change the overall thickness of adjacent or neighboring bands or strips. For example, the thickness of the smooth bands 2 may be chosen to be greater than the thickness of the corrugated band 3 or vice versa.

Futhermore, the shape of the individual corrugations in the bands 3 or strips 3', 3'', etc. may be other than sinusoidal. In particular, it may be of triangular cross section or may meander in a sequence of semi-circles. Still other forms of individual corrugations are possible. The sinusoidal form of corrugations is illustrated in FIG. 7. The matrix 1 may be constructed as generally indicated in FIG. 1 by rolling up a sandwich of bands and strips. Alternatively however, it can be constructed of a block of flat bands 2, 3 piled one on top of the other.

While the invention has been described in a number of preferred exemplary embodiments, it is to be understood that these serve entirely for the purpose of illustration and explanation rather than for limitation. In particular, features of one embodiment may be usable in another and all embodiments are subject to modification and changes lying within the competence of a person skilled in the art without departing from the scope of the invention.

What is claimed is:

1. A support matrix for a catalytic reactor for scrubbing exhaust gases from internal combustion engines, comprising alternating steel panels coated with catalyst, at least one of said panels being corrugated, and at least one of the steel panels being provided with projections and/or depressions, said depressions being apertures and wherein according to the invention said apertures extend over the entire longitudinal extent of the panel, thereby separating at least one of said panels into narrow strips disposed at a transverse separation from one another.

2. A matrix according to claim 1, wherein the separate strips are smooth.

3. A matrix according to claim 1, wherein the separate strips are corrugated.

4. A matrix according to claim 1, wherein said strips are separated from one another in the direction of gas flow transverse with respect to said panels by a distance which is less than or equal to 25 mm.

5. A matrix according to claim 1, wherein the width of said strip in the direction of gas flow is less than or equal to 50 mm.

6. A matrix according to claim 1, wherein the corrugation of adjacent strips has a different character.

7. A matrix according to claim 1, wherein the amplitude of corrugations of strips in neighboring layers is different.

8. A matrix according to claim 6, wherein the wavelength of corrugations of adjacent strips is different.

9. A matrix according to claim 5, wherein the wavelength of adjacent strips in the direction of gas flow decreases.

10. A matrix according to claim 1, wherein the character of corrugations of neighboring strips alternates.

11. A matrix according to claim 9, wherein the waves of the corrugation make an angle other than zero degrees with the direction of gas flow through the matrix.

12. A matrix according to claim 11, wherein the angle between the waves of the corrugation and the direction of gas flow of adjacent component panels or strips of the matrix. alternates in algebraic sign.

13. A matrix according to claim 10, wherein the angle of adjacent corrugations is alternatingly different.

14. A matrix according to claim 1, in which at least one of the component steel parts of the matrix has additional apertures while the neighboring layer of components is disposed in the vicinity of said additional apertures.

15. A matrix according to claim 14, wherein said additional apertures extend over the entire length of the component of the matrix, thereby separating the second one of the panels into separate strips and wherein strips of neighboring layers overlap.

16. A matrix according to claim 1, wherein the thickness of adjacent or neighboring panels varies.

17. A matrix according to claim 11, wherein all steel panels of the matrix are corrugated and the corrugations extend over the entire width of the band in a direction oblique with respect to the direction of gas flow.

* * * * *